(12) United States Patent
Wakayama et al.

(10) Patent No.: US 7,858,684 B2
(45) Date of Patent: Dec. 28, 2010

(54) SOLID COMPOSITE MATERIAL AND PRODUCTION METHOD THEREOF

(75) Inventors: Hiroaki Wakayama, Nissin (JP); Yoshiaki Fukushima, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 102 days.

(21) Appl. No.: 11/866,173

(22) Filed: Oct. 2, 2007

(65) Prior Publication Data
US 2008/0085964 A1 Apr. 10, 2008

(30) Foreign Application Priority Data
Oct. 6, 2006 (JP) .............................. 2006-275530

(51) Int. Cl.
C08K 3/00 (2006.01)
C08K 3/26 (2006.01)
C09D 17/00 (2006.01)
C08G 65/04 (2006.01)
C08F 6/00 (2006.01)
C08J 3/00 (2006.01)

(52) U.S. Cl. .................... 524/424; 524/425; 528/421; 528/483

(58) Field of Classification Search ................ 524/424, 524/425, 413
See application file for complete search history.

(56) References Cited

U.S. PATENT DOCUMENTS 5,529,914 A * 6/1996 Hubbell et al. ............... 435/182
2004/0197483 A1 * 10/2004 Wakayama et al. ......... 427/377

FOREIGN PATENT DOCUMENTS

| JP | 57-21423 | 2/1982 |
|---|---|---|
| JP | 3-60729 | 3/1991 |
| JP | 2000-508258 | 7/2000 |

(Continued)

OTHER PUBLICATIONS

Grassmann, O., et al. Organic-Inorganic Hybrid Structure of Calcite Crystalline Assemblies Grown in a Gelatin Hydrogel Matrix: Relevance to Biomineralization. Chemistry of Materials, vol. 14(11), p. 4530-4535, Oct. 15, 2002.*

(Continued)

*Primary Examiner*—Harold Y Pyon
*Assistant Examiner*—Anthony H Sheh
(74) *Attorney, Agent, or Firm*—Oblon, Spivak, McClelland, Maier & Neustadt, L.L.P.

(57) ABSTRACT

An object of the invention is to provide a solid composite material easily molded into a desirable shape and superior both in hardness and toughness, and a method of producing the same. A solid composite material 1 having an organic matrix of fibrous organic polymers of nonionic polymer and fine particles of a crystalline metal carbonate having an average diameter of 30 nm or less dispersed therein and a production method thereof. The production method includes mixing, gelation, and reactive precipitation steps. In the mixing step, a liquid mixture is prepared by mixing a hydrophilic nonionic polymers with a metal ion source in water. In the gelation step, the nonionic polymer in the liquid mixture is allowed to gel, to give a gel solvent. In the reactive precipitation step, a metal carbonate is precipitated by adding a carbonic acid source to the gel solvent.

15 Claims, 5 Drawing Sheets

FOREIGN PATENT DOCUMENTS

| | | |
|---|---|---|
| JP | 2004-307262 | 11/2004 |
| WO | WO 97/37827 | 10/1997 |

OTHER PUBLICATIONS

Grassmann, O. et al. Biomimetic control of crystal assembly by growth in an organic hydrogel network. American Mineralogist, vol. 88, p. 647, 2003.*

Stellwagen, N. C. Apparent pore size of polyacrylamide gels: Comparison of gels cast and run in Tris-acetate-EDTA and Tris-borate-EDTA buffers. Electrophoresis, vol. 19, p. 1542-1547.*

Chang, H.-T., Yeung, E.S. Journal of Chromatography B: Biomedical Applications, vol. 669, p. 113-123, 1995.*

Katti, K.S., Mohanty, B., Katti, D.R. J. Mater. Res., vol. 21, No. 5, p. 1237-1242, May 2006.*

Li, X., Xu, Z.-H., Wang, R. Nano Lett, vol. 6, No. 10, p. 2301-2304, Sep. 14, 2006.*

Cölfen, H. Current Opinion in Colloid and Interface Science, vol. 8, p. 23-31, 2003.*

Yu, S.-H., Cölfen, H. J. Mater. Chem., vol. 14, p. 2124-2147, 2004.*

Jada. A., Pefferkorn, E. J. Mater. Sci. Lett., vol. 19, p. 2077-2079, 2000.*

Schweizer, S., Taubert, A. Macrmol. Biosci. vol. 7, p. 1085-1099, 2007.*

Cölfen, H., Top Curr Chem, vol. 271, p. 1-77, 2006.*

Takashi Kato et al., "Calcium Carbonate-Oraganic Hybrid Materials", Advanced Materials, vol. 14, No. 12, Jun. 18, 2002, pp. 869-877.

* cited by examiner

SOLID COMPOSITE MATERIAL AND PRODUCTION METHOD THEREOF

CROSS-REFERENCES TO RELATED APPLICATIONS

The present application claims priority under 35 U.S.C. §119 to Japanese Application No. 2006-275530, filed Oct. 6, 2006, entitled "SOLID COMPOSITE MATERIAL AND PRODUCTION METHOD THEREOF". The contents of this application are incorporated herein by reference in their entirety.

BACKGROUND OF THE INVENTION

1. Field of the Invention

The present invention relates to a solid composite material where fine particles of a crystalline metal carbonate are dispersed in an organic matrix at the nano level and a method of producing the same.

2. Background of the Invention

Crystals of a metal carbonate such as calcium carbonate are superior in strength and thus attracting attention as high-strength materials. However, the metal carbonate crystals had a disadvantage as material that they were brittle.

Accordingly, under progress is development for composite materials superior both in strength and toughness, in combination of a metal carbonate and an inorganic material and/or an organic material.

Specifically, proposed was a method of preparing saturated aqueous $CaCO_3$ solution and depositing a $CaCO_3$ film on a substrate by using the saturated aqueous $CaCO_3$ solution (see Non-Patent Document 1).

Alternatively, proposed was a method of depositing a carbonate film on an organic matrix, by placing a substrate having an organic matrix coated on the surface and a raw material solution containing a raw carbonate material and an organic polymer in a pressure vessel and introducing $CO_2$ gas into the pressure vessel (see Patent Document 1).

However, the conventional method of using saturated aqueous $CaCO_3$ solution is lower in reactivity, because of limited solubility. As a result, it demands an elongated period of time to form a $CaCO_3$ film and the film formed is also thinner, making it difficult to prepare a large-area $CaCO_3$ film. In addition, to obtain a composite material in a desirable shape, it was necessary to process the composite material having a very hard $CaCO_3$ film. Thus, unfortunately, the conventional method gave only a product that is difficult to process and could not give a composite material in a desirable shape.

Strictly speaking, the material obtained by the conventional method of depositing a carbonate film on the organic matrix is not a composite material. It is only a laminate of a carbonate film and an organic matrix, and is not a composite material in which these components are mixed with each other (see FIG. 2 in Patent Document 1). Patent Document 1 discloses a method of producing a carbonate composite material by depositing a carbonate on the surface and/or in the micropore of the organic matrix. However, because an ionic organic matrix is used, the organic matrix may accumulate by aggregation because of salting out in the presence of a carbonate. Thus unfavorably, it was very difficult to obtain a composite material in any shape and the carbonate was easily localized in the organic matrix. It was thus difficult to obtain a composite material containing the organic matrix and a carbonate dispersed uniformly. It was also difficult to obtain a composite material having desirable properties, such as high hardness and toughness.

Patent Document 1: JP 2004-307262 Unexamined Patent Publication (Kokai)

Non-Patent Document 1: Takashi Kato and two others, Calcium Carbonate-Organic Hybrid Materials, "ADVANCED MATERIALS", (Germany), Jun. 18, 2002, Vol. 14, No. 12, p. 869-877

An object of the present invention is to provide a solid composite material easily molded into a desirable shape and superior both in hardness and toughness, and a method of producing the same.

SUMMARY OF THE INVENTION

A first aspect of the present invention relates to a method of producing a solid composite material containing an organic matrix of fibrous organic polymers and crystalline fine particles of a metal carbonate, i.e., a carbonate of one or more metals selected from Ca, Mg, Fe, Cu, Co, Mn, and Ni, dispersed in the organic matrix, comprising:

a mixing step of preparing a liquid mixture by mixing in water hydrophilic nonionic polymers gelling in water and a metal ion source supplying one or more metal ions selected from Ca ion, Mg ion, Fe ion, Cu ion, Co ion, Mn ion, and Ni ion in water;

a gelation step of preparing a gel solvent containing the organic matrix of nonionic polymer gel and the metal ion dispersed in the organic matrix by allowing the nonionic polymers in the liquid mixture to gel; and a reactive precipitation step of preparing the solid composite material in which the fine particles having an average diameter of 30 nm or less are dispersed in the organic matrix, by adding a carbonic acid source supplying carbonate ion in water to the gel solvent and thus precipitating crystalline fine particles of the metal carbonate in the organic matrix.

In the production method of the first aspect of the invention, the mixing step, the gelation step, and the reactive precipitation step are carried out.

In the mixing step, a liquid mixture is prepared by mixing in water hydrophilic nonionic polymers gelling in water with a metal ion source supplying one or more metal ions selected from Ca ion, Mg ion, Fe ion, Cu ion, Co ion, Mn ion, and Ni ion in water. In the mixing step, the liquid mixture containing the nonionic polymers and the metal ion uniformly dispersed is obtained, because the hydrophilic nonionic polymers are used.

In addition, in the gelation step, a gel solvent containing the organic matrix of nonionic polymer gel and the metal ion dispersed in the organic matrix is prepared, by allowing the nonionic polymer in the liquid mixture to gel.

In addition, in the reactive precipitation step, fine particles of the crystalline metal carbonate are precipitated in the organic matrix, by adding a carbonic acid source supplying carbonate ion in water to the gel solvent. When the carbonic acid source is added to water, the carbonate ion supplied from the carbonic acid source and the metal ion dispersed in the organic matrix react with each other, precipitating fine particles of the crystalline metal carbonate in the organic matrix. Use of the nonionic polymer then is effective in preventing aggregation of the organic matrix by salting out.

In this way, according to the first aspect of the present invention, it is possible to obtain the solid composite material described above in which fine particles of crystalline metal carbonate having an average diameter of 30 nm or less are dispersed in the organic matrix of fibrous organic polymers of the nonionic polymers.

In the solid composite material obtained by the production method of the first aspect of the invention the fine particles of crystalline metal carbonate having an average diameter of 30 nm or less are dispersed in the organic matrix of the organic polymers. More specifically in the solid composite material above, the fine particles and the organic polymers are dispersed at the nano level, and the organic polymers for the organic matrix is dispersed among the fine particles. Thus, the solid composite material shows properties favorable both in hardness and toughness.

In addition, in the gelation step, for example, the nonionic polymers in the liquid mixture can be molded in a forming die having a desirable shape by gelation. Also in the reactive precipitation step, the metal carbonate may be precipitated in the forming die having desirable shape. Thus, it is possible to prepare the solid composite material in a desirable shape easily.

A second aspect of the invention is a solid composite material, comprising an organic matrix of fibrous organic polymers and crystalline fine particles of a metal carbonate, i.e., a carbonate of one or more metals selected from Ca, Mg, Fe, Cu, Co, Mn, and Ni, dispersed therein, wherein the fine particles have an average diameter of 30 nm or less, and the organic polymers, which are hydrophilic nonionic polymers, are dispersed among the fine particles.

In the solid composite material, the fine particles has an average diameter of 30 nm or less and are dispersed in the organic matrix of the organic polymers. The organic polymers for the organic matrix are dispersed in the fine particles. Thus, in the solid composite material, the fine particles of the crystalline metal carbonate and the organic polymers for the organic matrix are dispersed with each other at the nano level. Accordingly, the solid composite material shows high hardness which is a property of crystalline metal carbonate, and also superior toughness, because the organic polymer plays a role, for example, as an adhesive between the fine particles.

The solid composite material of the second aspect of the invention is prepared, for example, by the production method of the first aspect of the invention. In this way, it is possible to produce the solid composite material easily and in a desirable shape, as described above.

DESCRIPTION OF THE PREFERRED EMBODIMENTS

Figure 1:
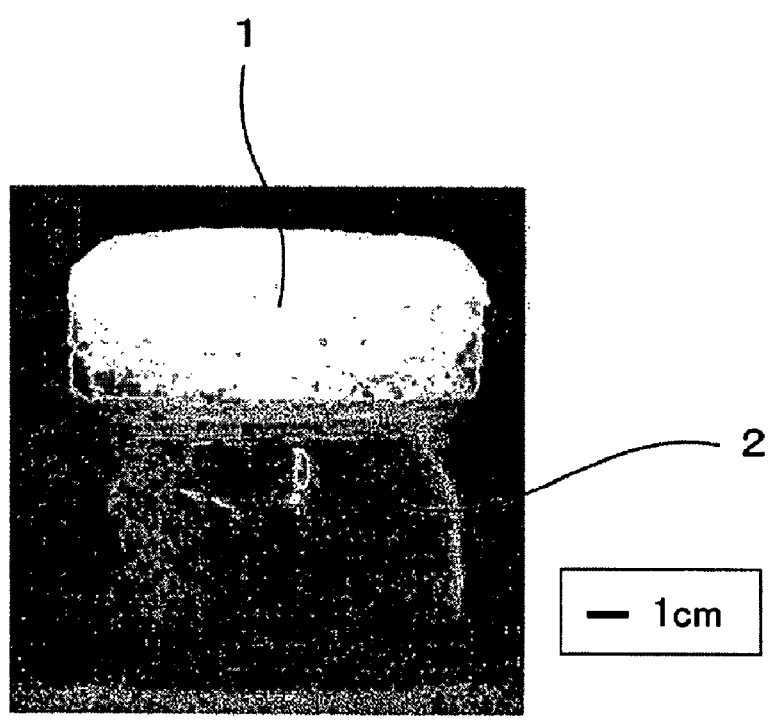
FIG. 1 is a photograph showing the appearance of the cap-shaped solid composite material (cap on a bottle) of Example 1.

Hereinafter, favorable embodiments of the present invention will be described.

In the solid composite material, the fine particles having an average diameter of 30 nm or less are dispersed in the organic matrix. The solid composite material may contain fine particles having a particle diameter of more than 30 nm partially, but the average diameter is still 30 nm or less even in such a case.

In the case the average diameter of the fine-particles is more than 30 nm, there is a danger that the deterioration in toughness of the solid composite material may deteriorate. More preferably, the average diameter of the fine particles is 10 nm or less.

The average diameter of the fine particles can be determined, for example, by X-ray diffractometry. Specifically, it is calculated, for example, from the half-value width of the peak of the metal carbonate in the X-ray diffraction pattern of the solid composite material obtained by X-ray diffraction.

It is preferable that the hydrophilic nonionic polymer in the mixing step is a polyalkyloxide or polyether or polyacrylamide.

In such a case, it is possible to cause gelation of the nonionic polymer easily in the gelation step. It is also possible to prevent aggregation of the nonionic polymer due to salting out more reliably even in the presence of a metal ion. Accordingly, it is possible to obtain a composite material in a desirable shape.

The polyalkyloxide for use is specifically one or more polymers selected from polyethyleneoxide, polyethylene glycol, and polypropyleneoxide or the like. The polyether for use is specifically, for example, polyvinylmethylether and/or polycellulose ether or the like.

The fine particles in the solid composite material are of a metal carbonate, that is a carbonate of one or more metals selected from Ca, Mg, Fe, Cu, Co, Mn, and Ni.

For example, a salt of one or more metals selected from Ca, Mg, Fe, Cu, Co, Mn, and Ni is used as the metal ion source in the mixing step. Examples of the salts include acetate, chloride (hydrochloride), nitrate salt, carboxylate, sulfate, metal alkoxide, metal acetylacetonate, the derivatives thereof, and the like. It is possible to supply a metal ion easily by using such a salt in the mixing step.

It is preferable that the metal carbonate is calcium carbonate and the metal ion source is a calcium ion source supplying calcium ion in water.

In such a case, it is possible to prepare the solid composite material in which fine particles of crystalline calcium carbonate are dispersed in the organic matrix. Thus in such a case, it is possible to prepare a solid composite material superior both in hardness and toughness at higher level.

It is preferable that the calcium ion source is a calcium salt.

In such a case, it is possible to supply calcium ion easily by dissolving the calcium salt in water in the mixing step.

The most favorable method can be selected according to the kind of the nonionic polymer, as the method of making the nonionic polymer gelate in the gelation step. Typical examples thereof include gelation by heating, gelation by cooling, gelation by heating and then cooling, and the like. A polymer gelling by addition for example of a polymerization initiator or a polymer gelling spontaneously in an aqueous solution at room temperature may be used.

In the reactive precipitation step, the metal carbonate is allowed to precipitate by addition of the carbonic acid source into the gel solvent.

Any substance generating carbonate ion in water may be used as the carbonic acid source. Typical examples thereof include carbonates, $CO_2$ gas, and the like. Examples of the carbonates for use include sodium carbonate, lithium carbonate, potassium carbonate, and the like.

In is preferable that $CO_2$ gas as the carbonic acid source is fed into the gel solvent in the reactive precipitation step.

In such a case, it is possible to make the metal carbonate precipitate while preventing generation of by-products.

It is preferable that there is a molding step of molding the gel solvent in production of the solid composite material.

In such a case, it is possible to form the solid composite material in a desirable shape. The molding of the gel solvent can be accomplished, for example, by carrying out the gelation step and/or the reactive precipitation step in a forming die having a desirable shape.

It is preferable that the metal carbonate in the solid composite material used then is calcium carbonate.

In such a case, it is possible to improve the hardness and toughness of the solid composite material further more.

It is preferable that the fine particles are dispersed at an average interval of 30 nm or less.

In the case the average interval of the fine particles is more than 30 nm, there is a danger that the hardness of the solid composite material may decline. The average interval of the fine particles can be determined, for example, by observation under transmission electron microscope.

It is preferable that the content of the fine particles is 20 wt % to 99 wt % in the solid composite material.

In the case the content of the fine particles is less than 20 wt %, there is a danger that the hardness of the solid composite material may deteriorate. On the other hand, in the case of the content of more than 99 wt %, there is a danger that the toughness may deteriorate. More preferably, the content of the fine particles is 40 wt % to 95 wt %.

The solid composite material, which is characteristic in its superiority both in hardness and toughness, is favorably used in applications such as automobile engine part, instrumental panel, cap, block for openings, and others.

EXAMPLES

Example 1

Hereinafter, favorable examples of the present invention will be described with reference to FIGS. 1 and 2.

Figure 2:
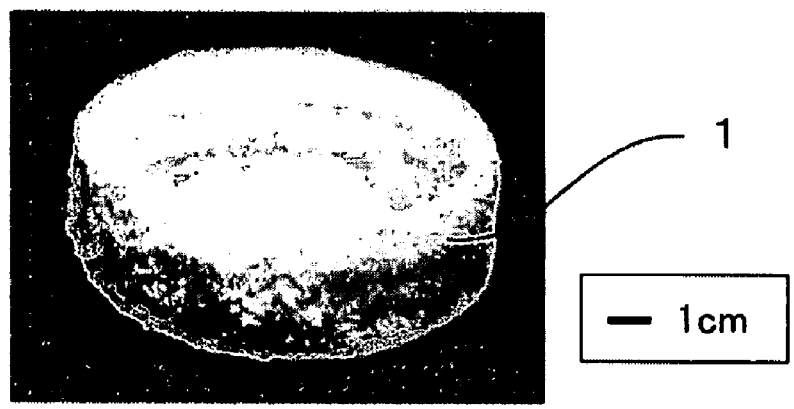
FIG. 2 is a photograph showing the appearance of the cap-shaped solid composite material (only cap) of Example 1.

As shown in FIGS. 1 and 2, a cap 1 for a bottle 2 is prepared as the solid composite material in the present Example. The solid composite material 1 has the organic matrix of fibrous organic polymers and fine particles of crystalline calcium carbonate dispersed in the organic matrix. Fine particles having an average diameter of 30 nm or less are dispersed in the solid composite material 1. In the solid composite material 1, the organic polymers, which are hydrophilic nonionic polymers, are dispersed among the fine particles.

In the production of the solid composite material of the present Example, in a mixing step, a gelation step and a reactive precipitation step are carried out.

In the mixing step, hydrophilic nonionic polymers gelling in water and a calcium ion source supplying calcium ion in water are mixed in water, and a liquid mixture is obtained. In the mixing step of the present Example, polyethyleneoxide is used as the nonionic polymer and calcium acetate as the calcium ion source.

In the gelation step, the nonionic polymers in the liquid mixture is allowed to gel. And a gel solvent in which calcium ions are dispersed in an organic matrix of nonionic polymer gel. In the present Example, the nonionic polymers are allowed to gel by heating.

In the reactive precipitation step, the gel solvent is poured into a forming die having a bottle cap shape, as shown in FIGS. 1 and 2, and calcium carbonate in the organic matrix is precipitated by addition of a carbonic acid source supplying carbonate ion in water, into the gel solvent. In the present Example, $CO_2$ gas is used as the carbonic acid source. In this way, a solid composite material in which the fine particles having an average diameter of 30 nm or less are dispersed in an organic matrix is produced.

Hereinafter, the method of producing the solid composite material of the present Example will be described in detail.

First, an aqueous calcium acetate solution at a concentration of 1.42 M was prepared. 30 g of polyethyleneoxide was added to 500 mL of the aqueous calcium acetate solution, and the mixture was agitated at room temperature for 10 minutes, and a liquid mixture was obtained (mixing step).

The liquid mixture was then kept at a temperature 90° C. for 3 hours, allowing polyethyleneoxide in the liquid mixture to gel. Thus, a gel solvent in which calcium ions are dispersed in the organic matrix of polyethyleneoxide gel was obtained (gelation step).

The gel solvent was then poured into a bottle cap-shaped forming die, which was then placed in a 1,000 mL autoclave. Subsequently, $CO_2$ gas was introduced to the gel solvent placed in the autoclave, and the system was kept at a temperature of 50° C. and a pressure of 8 MPa for 2 hours, allowing precipitation of crystalline calcium carbonate in the organic matrix (reactive precipitation step).

In this way, a solid composite material 1 in the shape reflecting that of the forming die (bottle cap) was obtained (see FIGS. 1 and 2). It is designated as test piece E1.

Example 2

In the present Example, a solid composite material (test piece E2) was produced by a production method different from that in Example 1.

Also in the present Example, a bottle cap is prepared as the solid composite material in a similar manner to Example 1 (see FIGS. 1 and 2). Similarly to the test piece E1 of Example 1, the solid composite material of the present Example (test piece E2) contains an organic matrix of fibrous organic polymers and fine particles of crystalline calcium carbonate dispersed in the organic matrix. In the solid composite material, the fine particles are dispersed at an average diameter of 30 nm or less, and the organic polymers, which are made of hydrophilic nonionic polymers, is dispersed among the fine particles.

In the present Example, calcium nitrate is used as the calcium ion source, polyacrylamide, as the hydrophilic nonionic polymer, and a carbonate (sodium carbonate), as the carbonic acid source, to give a solid composite material.

Specifically, an aqueous $Ca(NO_3)_2$ solution at a concentration of 1.4 M was prepared first; 30 g of polyacrylamide was added to 500 mL of the aqueous $Ca(NO_3)_2$ solution; and the mixture was agitated at room temperature for 10 minutes, thus a liquid mixture (mixing step) was obtained.

Subsequently, the liquid mixture was poured into a bottle cap-shaped forming die similar to that in Example 1, and left at room temperature for 60 minutes, allowing gelation of the polyacrylamide. Thus, a gel solvent in which calcium ions are dispersed in the organic matrix of polyacrylamide gel was obtained (gelation step).

The gel solvent was then immersed in 500 mL of 1.4 M aqueous $Na_2CO_3$ solution, allowing precipitation of calcium carbonate crystal in the organic matrix (reactive precipitation step).

In this way, a solid composite material in the shape reflecting that of the forming die was obtained. The solid composite material is designated as test piece E2.

Testing Example

In the present Example, the structure and mechanical properties of two kinds of solid composite material (test pieces E1 and E2) prepared in Examples 1 and 2 were evaluated.

First, the test piece E1 or E2 was subjected to X-ray diffraction analysis by using a Cu-Kα X-ray diffractometer (RINT2100, manufactured by Rigaku Corporation). The average particle diameter of the crystalline $CaCO_3$ fine particles was calculated from the half-value width of the peak corresponding to $CaCO_3$ crystal in the X-ray diffraction pattern obtained. The results showed that the fine-particle average diameter of the test piece E1 was 2.6 nm, while the fine-particle average diameter of the test piece E2 was 5.3 nm. In addition, the position of the peak corresponding to the $CaCO_3$ crystal indicated that the fine particle is made of aragonite $CaCO_3$ crystal.

The structure of the test pieces E1 and E2 was observed under a transmission electron microscope (TEM). The results are summarized in FIG. 3 (test piece E1) and in FIG. 4 (test piece E2). In the FIGS. 3 and 4, a black region indicates a crystalline $CaCO_3$ fine particle, while a white region indicates an organic polymer.

Figure 3:
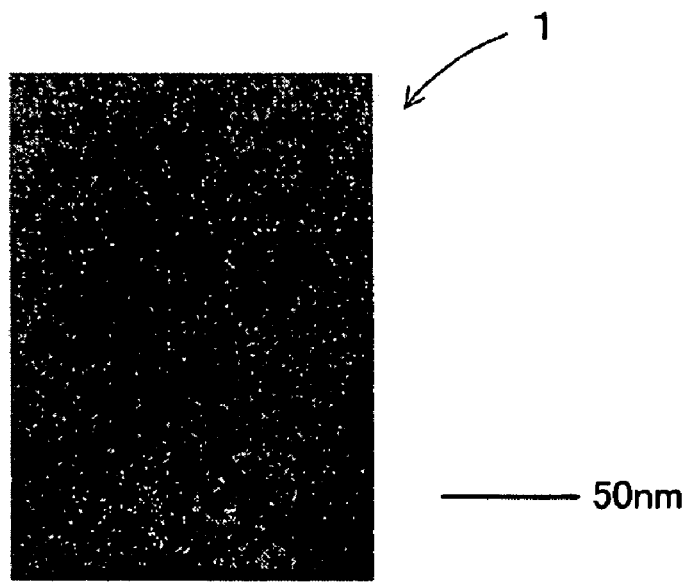
FIG. 3 is a photograph showing the appearance of the solid composite material (test piece E1) when it is observed by transmission electron microscope in a Testing Example.
Figure 4:
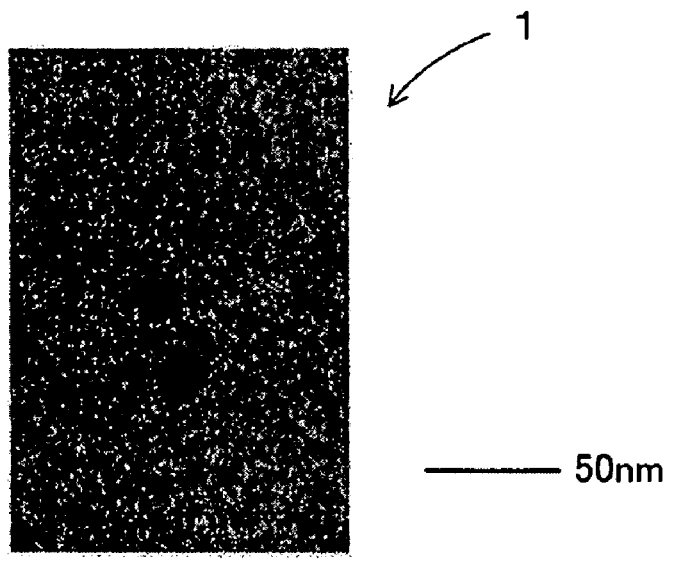
FIG. 4 is a photograph showing the appearance of the solid composite material (test piece E2) when it is observed by a transmission electron microscope in a Testing Example.

As apparent from FIG. 3, the crystalline $CaCO_3$ fine particles having an average diameter of 30 nm or less are integrated with the organic polymer in the test piece E1. As apparent from FIG. 4, the fine particles having an average diameter of 30 nm or less also in the test piece E2 are integrated with the organic polymer, similarly to the test piece E1, but there were some fine particles having a particle diameter of approximately 20 nm partially contained therein. However, the average diameter of the fine particles in the test piece E2 was still 30 nm or less, as described above.

Then, the mechanical property, specifically the bending strength, of the solid composite materials of test pieces E1 and E2 was determined. The solid composite material used in measurement of the bending strength is not strictly the same as the test piece E1 or E2. In other words, it is a solid composite material prepared almost similarly to the test piece E1 of Example 1 or the test piece E2 of Example 2, but different only in shape. The solid composite material used for measurement of bending strength was a strip specimen (length: 200 mm×width: 30 mm). Because the strip specimens are solid composite materials prepared in a similar manner to the test piece E1 of Example 1 and the test piece E2 of Example 2, except that the strip specimens were prepared by using a strip-shaped forming die, these test pieces are also called respectively test piece E1 and test piece E2 for convenience.

The bending strength (MPa) was determined according to the method specified in JIS K7055. The results are shown in FIG. 5.

The bending strength of a test piece (test piece C) made of a crystalline $CaCO_3$ for comparison with the test pieces E1 and E2 was determined, similarly to the test pieces E1 and E2. The results are shown in FIG. 5.

As the test piece C, a sample made of a commercially available limestone (available by Shiraishi Calcium Kaisha, Ltd.) which was processed into the shape identical with that of the test piece E1 or E2 for measurement of the bending strength measurement was used.

Figure 5:
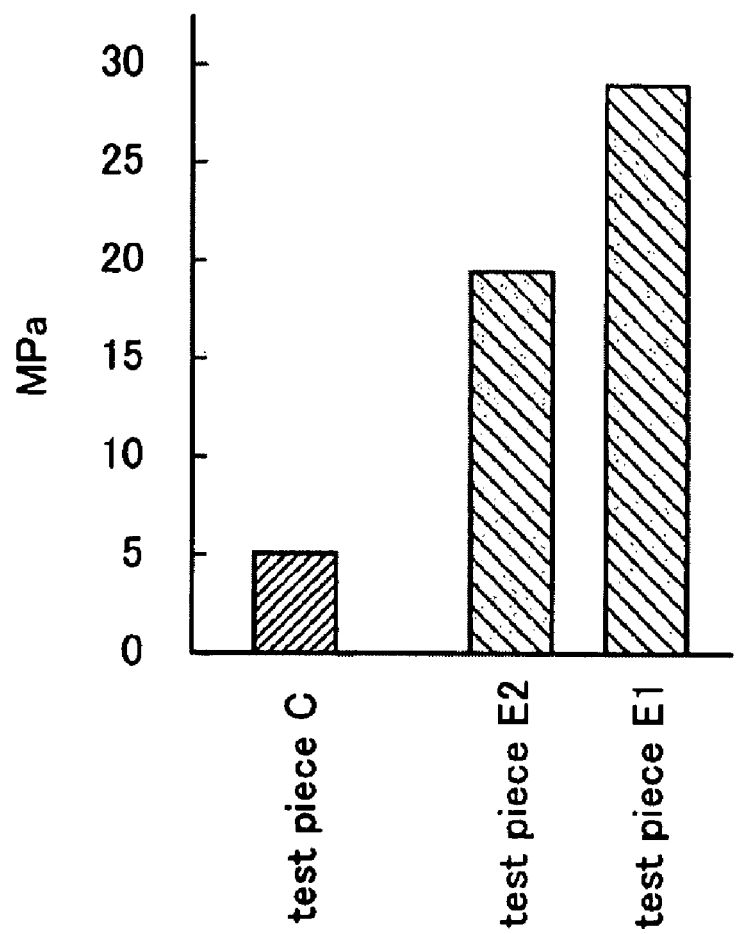
FIG. 5 is a graph showing the results of measuring the bending strength of the solid composite materials (test pieces E1 and E2) and limestone (test piece C) in a Testing Example.

As apparent from FIG. 5, test pieces E1 and E2 are improved significantly in bending strength compared to the test piece C, indicating that the solid composite materials of the test pieces E1 and E2 are superior in toughness compared to limestone (test piece C). The test pieces E1 and E2 contain crystalline calcium carbonate, similarly to the test piece C, and thus, have a hardness similar to that of the test piece C.

Obviously as described above, the solid composite materials prepared (test pieces E1 and E2) in Examples 1 and 2 are materials superior both in hardness and toughness.

What is claimed is:

1. A method of producing a solid composite material consisting of an organic matrix of fibrous organic polymers and crystalline fine particles of a metal carbonate dispersed in the organic matrix, the method comprising:

preparing a liquid mixture by mixing in water hydrophilic nonionic polymers gelling in water and a metal ion source supplying one or more metal ions selected from Ca ion, Mg ion, Fe ion, Cu ion, Co ion, Mn ion, and Ni ion in water;

preparing a gel solvent containing the organic matrix of nonionic polymer gel and the metal ion dispersed in the organic matrix by allowing the nonionic polymers in the liquid mixture to gel; and preparing the solid composite material in which the fine particles having an average diameter of 30 nm or less are dispersed in the organic matrix, by adding a carbonic acid source supplying carbonate ion in water to the gel solvent and thus precipitating crystalline fine particles of the metal carbonate in the organic matrix, wherein the hydrophilic nonionic polymers are selected from the group consisting of polyalkyloxides.

2. The method of producing a solid composite material according to claim 1, wherein the metal carbonate is calcium carbonate and the metal ion source is a calcium ion source supplying calcium ion in water.

3. The method of producing a solid composite material according to claim 2, wherein the calcium ion source is a calcium salt.

4. The method of producing a solid composite material according to claim 1, wherein $CO_2$ gas as the carbonic acid source is fed into the gel solvent.

5. The method of producing a solid composite material according to claim 1, further comprising molding the gel solvent.

6. A solid composite material consisting of an organic matrix of fibrous organic polymers and crystalline fine particles of a metal carbonate dispersed therein, wherein the fine particles have an average diameter of 30 nm or less;

the organic polymers, which are hydrophilic nonionic polymers, are dispersed among the fine particles; and the hydrophilic nonionic polymers are selected from the group consisting of polyalkyloxides.

7. The solid composite material according to claim 6, wherein the metal carbonate is a calcium carbonate.

8. The solid composite material according to claim 6, wherein the content of the fine particles is 20 wt % to 99 wt % in the solid composite material.

9. The method of producing a solid composite material according to claim 1, wherein the metal carbonate is a carbonate of one or more metals selected from Ca, Mg, Fe, Cu, Co, Mn and Ni.

10. The method of producing a solid composite material according to claim 1, wherein the polyalkyloxides are selected from the group consisting of polyethyleneoxide and polypropyleneoxide.

11. The solid composite material according to claim 6, wherein the metal carbonate is a carbonate of one or more metals selected from Ca, Mg, Fe, Cu, Co, Mn and Ni.

12. The solid composite material according to claim 6, wherein the polyalkyloxides are selected from the group consisting of polyethyleneoxide and polypropyleneoxide.

13. The solid composite material according to claim 6, wherein the content of the fine particles is 40 wt % to 95 wt % in the solid composite material.

14. The method of producing a solid composite material according to claim 1, wherein the fine particles having an average diameter of 30 nm or less have an average diameter of 10 nm or less.

15. The solid composite material according to claim 6, wherein the fine particles have an average diameter of 10 nm or less.

* * * * *